May 19, 1936.  S. D. SHINKLE  2,041,496
COATED SHEET MATERIAL AND PROCESS OF MAKING
Filed Jan. 18, 1933
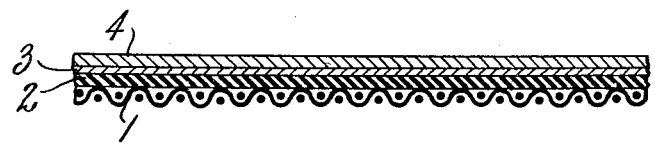
Inventor
SEAPHES D. SHINKLE
By his Attorney
Walter L. Piper Patented May 19, 1936

2,041,496

UNITED STATES PATENT OFFICE 2,041,496

COATED SHEET MATERIAL AND PROCESS OF MAKING

Seaphes D. Shinkle, Passaic, N. J., assignor, by mesne assignments, to United States Rubber Company, New York, N. Y., a corporation of New Jersey Application January 18, 1933, Serial No. 652,340

13 Claims. (Cl. 91—68)

This invention relates to coated fibrous sheet materials, and more particularly to materials having a hard, flexible, durable, glossy coating and suitable for use as auto topping. The invention also relates to the process of making the material.

The demands for serviceability made upon the finishing coatings of automobile topping fabrics are severe and exacting. The finish must be tough and durable, yet flexible. It must withstand long-continued exposure to direct sunlight, heat, cold, and other weather conditions, without dulling of the luster and without the development of unsightly cracks and checks which impair the luster and lead ultimately to flaking and disintegration of the finish and to the deterioration of the underlying rubber or other layer. Thus, the finish must be hard, yet not brittle nor having any tendency to become brittle. The best of ordinary coating compositions, such as high grade oil varnishes having a long life when applied to most materials, are totally unsatisfactory when applied to fabrics having a rubberized or other under coat, becoming dull and brittle, and even forming large deep cracks, after a relatively short period of use.

For a number of years varnishes having an asphalt base have been extensively used for finishing automobile topping fabrics. An asphalt varnish per se is likely to result in a rather brittle coating. As a consequence it has been necessary to employ relatively soft or low-melting asphalts. According to the prior art, petroleum asphalts having a softening point between 150° and 250° F. (ball and ring method) have been particularly recommended. The disadvantages attending the use of such asphalts are, among others, the difficulty of so bodying the varnish as to prevent its flowing at the temperatures customarily used for vulcanizing the rubber and baking the varnish; and their tendency to produce dulling of the luster upon exposure, due probably to their content of relatively volatile substances or of substances which are readily oxidizable. Drying oils, sometimes used in these varnishes to provide the proper consistency at baking temperatures and to decrease the brittleness of the dried film, also contribute to the dulling of the luster upon exposure. As a result the proportion of oil to asphalt has been kept as low as is consistent with the purposes for which the oil is used.

Even the softer asphalts, when used as the principal film-forming base of varnishes for auto topping, confer sufficient brittleness upon the dried finishing coat so that it has been found desirable to employ a more flexible intermediate coating, consisting essentially of a long oil varnish, to act as a cushion between the rubber and the more brittle asphalt finishing coat.

In the prior practices the use of the harder asphalts, particularly those softening at about 300° F., or above, although desirable from the point of view of luster and durability, has been precluded by the lack of any suitable softening agent or plasticizer therefor. Many resinous and other materials have been tried for this purpose, including the oil-soluble phenol-aldehyde resins, polyhydric alcohol-polybasic acid resins, polymerized terpenes, and chlorinated naphthalenes, as well as liquids such as dibutyl phthalate and tricresyl phosphate, which are commonly used as plasticizers for various types of coating compositions. These materials have been found unsuited for use in asphalt varnishes for auto topping, either because of their tendency to "bleed" to the surface, thus dulling the luster of the finish, or because of their volatility or of their tendency to migrate into the underlying rubber layer, resulting in embrittlement of the asphalt finishing coat and its consequent cracking and flaking.

An object of the present invention is to provide a coated fibrous sheet material having a finish which is tough and hard, yet flexible, which is durable under severe weather conditions, and which has a high luster that will be retained for long periods without dulling or checking.

Another object is to provide an improved material for auto topping.

Still another object is to provide a process for making such materials.

Other objects will appear from a perusal of the detailed specification and claims.

In the drawing the figure is a greatly enlarged cross section of an auto topping made in accordance with the invention.

In the present invention I have discovered a method whereby the harder asphalts, that is, those having a softening point between 250° and 380° F. (as determined by the ball and ring method), may be employed in the production of finishing compositions for plastic-coated fibrous sheet materials, such as automobile topping. The rubber or otherwise coated fibrous backings to which these compositions are applied have a durable finish which retains its luster and its flexibility over longer periods of time than have been possible with any previous coating compositions. My method, although capable of various modifications, comprises the essential feature of applying over the uncured rubber or other base coat, a finish coat of a varnish comprising a hard asphalt and chlorinated aryl benzenes, such as chlorinated diphenyls. The finish is then dried, preferably by baking at a temperature which is also suitable for vulcanization of the rubber compound, when the base coat is of rubber, in accordance with common practice. In the preferred embodiment of my process I apply such finish coat over an intermediate coat of oil varnish, after which the material is baked to complete the vulcanization and to dry the varnish, and effect a durable amalgamation between the intermediate and the finish coats. However, the use of an intermediate oil varnish is not essential to good results, and it may be omitted.

Whether the one-coat or the two-coat method is followed in my process, the finish coat consists essentially of an asphalt having a softening point above about 250° F. and preferably above 300° F., chlorinated diaryl, and a suitable volatile solvent or thinner. Although drying oils may be added if desired, the addition of as little as 2 parts of drying oil (by weight) per 100 parts of varnish base, has been found to materially impair the luster upon exposure.

While in general various proportions of the chlorinated diaryls such as diphenyls and the specified harder asphalts may be used, the proportions which I prefer to use, when employing chlorinated diphenyls, range from 50 parts of chlorinated diphenyl and 50 parts of asphalt, to 80 parts of chlorinated diphenyl and 20 parts of asphalt. In such proportions the chlorinated diphenyls serve to impart the proper flexibility to the dried films, without having the slightest tendency to impair the luster or the durability, or to migrate into the base coat. It is to be understood that chlorinated diphenyls per se are entirely unsuited for use as the sole varnish base, because they either do not dry to a non-tacky finish, or result in a brittle film.

As the asphaltic ingredient of my final coat I use an asphalt having a softening point between 250° and 380° F. I prefer to use one having a softening point above 300° F. and preferably a relatively hard natural asphalt, although other asphaltic materials, such as petroleum asphalts, etc., having the proper softening point, may be used. I have obtained the best results using a brilliant refined natural asphalt having a softening point of 345–350° F., (ball and ring method).

Suitable chlorinated diphenyls are such as those available on the market under the trade name of "Arochlor", ranging in chlorine content from 19% to 68% and in consistency from limpid liquids to brittle solids. Of these I prefer to use those viscous or semi-liquid products containing from about 54% to about 62% chlorine, and particularly chlorinated diphenyl containing about 62% of chlorine. These chlorinated diphenyls of 54 to 62% chlorine content boil at about 350–400° C.

Commercial chlorinated diphenyls are obtained by chlorinating diphenyl produced by pyrolysis of benzene, and therefore contain some chlorination products of higher hydrocarbons closely related to diphenyl, such as diphenyl-benzene. When the term chlorinated diaryl or diphenyl is broadly used in this specification it is therefore intended that it shall cover the chlorination products of such higher or aryl substituted diphenyls as well as those of diphenyl itself.

It is to be understood that my varnishes, comprising a hard asphalt and chlorinated diaryls as the basic film-forming constituents, are novel and distinctive compositions characterized in that they contain a mixture of two film-forming constituents neither of which per se is at all adapted to the uses for which my compositions are particularly intended, but which in combination exhibit to a maximum degree the desired qualities. My varnishes are further characterized in that they are capable of producing dried films of the proper flexibility and other desired qualities without recourse to the use of drying oils therein.

It is obvious that by choosing various hard asphalts and chlorinated diaryls of different consistencies, and by varying the relative proportions of said constituents, I may prepare coating compositions adapted to produce dried films having widely varying degrees of flexibility.

In the manufacture of rubberized automobile topping by my process, it is advantageous to include the usual step of applying directly to the surface of the warm calendered uncured rubber base coat a tackiness-removing composition such as a water shellac, in order to facilitate the subsequent embossing of the rubber by means of embossing rolls. Any of the usually employed rubber compounds may be used for the base coat, such compounds ordinarily consisting of a large proportion of reclaimed rubber with a minor proportion of new rubber. As is well known, the primary reason for employing reclaimed rubber is that it is lacking in the liveliness of new rubber and will therefore retain an embossed design better until the design can be fixed by vulcanization. After the rubberized fabric has been embossed, the finishing coat or coats of varnish are applied.

When using the one-coat method, a coating of my varnish is applied to the uncured rubber and the goods are then baked at a suitable temperature and for a sufficient time to vulcanize the rubber and to thoroughly dry the varnish and permit the film to become tenaciously adherent to the rubber, e. g. the material may be baked for 2 to 3 hours at 250° F.

When using the two-coat method, I first apply to the uncured rubber an intermediate coat of oil varnish. This coat may then be air-dried, if desired, or it may be dried by heating at an elevated temperature for a length of time insufficient to effect appreciable vulcanization of the rubber,—for example, by heating for ¼ to ½ hour at 250° F. Thereafter I apply a final coat of my new composition and finish by baking at a temperature of, for example, 240° F. to 275° F. for sufficient time to complete the vulcanization of the rubber, e. g. for two hours at 250° F.

Similar procedures may be employed where the base coat is of other material than rubber.

The following procedure is given as one example of the methods used in preparing my new modified hard-asphalt varnishes: Hard asphalt and chlorinated diphenyl are melted together in a suitable vessel, then heated at a temperature of 350° to 400° F., with constant stirring for one to two hours, or until the batch becomes perfectly uniform. One hour's heating of the batch at the temperature specified is generally sufficient to insure uniformity and freedom from lumps, but further heating for an additional hour at the same temperature has been found to result in increased durability of the finished coating. After the heating the batch is allowed to cool to about 275° F. and is then thinned with turpentine. The amount of turpentine added at this point should be at least equal to the weight of the base mixture to which it is added, in order to insure a workable consistency when the thinned batch has cooled to room temperature. The remainder of the thinner may be added subsequently in any desired amount, or the total amount of thinner to be used may be added all at once when the cooling batch has reached the proper temperature. In place of turpentine, solvent naphtha, gasoline, benzene, toluene, xylene, varnish makers' and painters' naphtha, etc., or any desired mixtures thereof may be used.

The oil varnish which I employ as the intermediate coat in the two-coat method may be any of the ordinary long oil varnishes, consisting essentially of drying oil, gum, drier, and thinner, to which pigments may be added, if desired. I may also add a small proportion of an asphaltic material and/or chlorinated diphenyl, in order to promote good adhesion between the intermediate and the final coats. While the use of a hard asphaltic material is preferred, when employed in the intermediate coat, softer asphalts may be used. The gum used may be any of the natural, modified natural, or synthetic resins commonly used as varnish bases, or mixtures thereof. Cellulosic varnishes, such as pyroxylin, suitably modified by plasticizers such as sebacic acid-glycerol resin, may also be used as an intermediate coating.

The following composition is illustrative of the oil varnishes I have used as the intermediate coat:

A

| | Lbs. |
|---|---|
| Sebacic acid-glycerol resin ("Paraplex") | 7.5 |
| Oil-soluble formaldehyde-salicyclic acid resin | 7.5 |
| Bodied China wood oil | 35 |
| Carbon black | 1 |
| Manganese linoleate | 0.5 |
| Turpentine | 154.5 |

B

| | Lbs. |
|---|---|
| Brilliant black refined natural asphalt (softening point 345–350° F.) | 7.5 |
| Chlorinated diphenyl (62% chlorine) | 7.5 |
| Turpentine | 45 |

Larger proportional amounts of asphalt and chlorinated diphenyl may be used in the intermediate coat varnish, as long as the amounts are insufficient to appreciably impair the bridging action of the intermediate coat between the soft base coat and the outer coat. Mixtures A and B are prepared separately, and then mixed in the proportion shown to form the varnish used as the intermediate coat. In place of the B mixture, as an ingredient of the intermediate varnish, I may use a mixture consisting only of 10 pounds of the asphalt used in B, and 50 pounds of turpentine.

While I have indicated, above, the various proportions in which I may mix the hard asphalt and chlorinated diaryl in preparing my varnish to be used as the final coat, the following is illustrative of a preferred composition which I have found to be of superior quality.

Final coat

| | Lbs. |
|---|---|
| Refined natural asphalt (softening point 345–350° F.) | 50 |
| Chlorinated diphenyl (62% chlorine) | 50 |
| Turpentine | 300 |

While I prefer to dry my final coating by baking, as disclosed above, the compositions used for the final coating are also adapted to produce a dry, non-tacky finish when dried at lower temperatures, such as atmospheric or ordinary room temperatures. The final coating may accordingly be applied subsequently to the vulcanization of the rubber and may then be air-dried, that is, dried at a temperature insufficient to effect further vulcanization of the rubber. The compositions used for the final coating may also be applied as refinishing coatings on used automobile topping. For the latter purpose the proportions which I prefer to use range from 70 parts of chlorinated diphenyl and 30 parts of hard asphalt, to equal parts of each. These proportions are also suitable for use in the one coat procedure on new work.

In the drawing there is shown on a greatly enlarged scale a cross section of an auto topping made in accordance with the invention. In the drawing the numeral 1 designates a fibrous backing material such as any suitable woven fabric, and superposed on this is a base coating 2, such as a rubber compound, and upon the base coating is disposed an intermediate coat 3, which may be an oil varnish such as described and upon which is superposed the final coat 4 which may be composed of a hard asphalt and chlorinated diaryl composition.

By the present invention, when using either one or two coats, I am enabled to utilize all of the good qualities of a hard asphalt desirable in a finishing coating, such as hardness, high and durable gloss, immunity to oxidation, and other valuable features of hard asphalts, while at the same time the coating is tough, flexible and firmly united to the intermediate or the base coat. As a result, coated fibrous sheet backings which are finished by the present process, such as auto toppings, may be produced with a very fine gloss which will be retained for long periods without dulling or checking, while at the same time the finish is hard, tough but flexible, and is very firmly bound to the underlying base or intermediate coat.

For backing material, there may be used any of the usually employed textile fabrics, or backings formed from bats of fibre or in any other suitable manner.

While in the specific examples given, the base coat disclosed has been a rubber compound, I have also found that base material, having the characteristics of pyroxylin mixed with a suitable plasticizer such as resins of the nature of sebacic acid-glycerin resin, may be used in place of rubber.

When a two-coat finish is employed, there may be used in place of an oil varnish a pyroxylin or like varnish containing a suitable plasticizer such as the sebacic acid-glycerin resin above referred to.

While preferred embodiments have been specifically disclosed, it is obvious that numerous modifications may be made in the invention without departing from the spirit thereof, and it is not desired to limit the invention otherwise than as set forth in the appended claims.

Having thus described my invention, what I claim and desire to protect by Letters Patent is:

1. As a new article, a flexible fibrous sheet backing material having a base coating of rubber-like material, and another coating comprising chlorinated diphenyl containing above about 54% chlorine and a hard, brilliant asphalt having a softening point above about 300° F., the ratio of chlorinated diphenyl to asphalt being not less than approximately 50:50.

2. As a new article, a flexible fibrous sheet backing material having a base coating of rubber-like material, and another coating comprising chlorinated diphenyl containing substantially 54-62% chlorine and a hard, brilliant natural asphalt having a softening point above 345° F.

3. As a new article, a flexible fibrous sheet backing material having a base coating of rubber-like material, and another coating comprising chlorinated diaryl and a hard, brilliant natural asphalt having a softening point of approximately 345-350° F., the ratio of chlorinated diaryl to asphalt being not less than 50:50 nor greater than 80:20.

4. As a new article, a flexible fibrous sheet backing material having a base coating of rubber-like material, and another coating comprising a chlorinated diphenyl of substantially 54-62% chlorine content and a hard, brilliant, refined natural asphalt having a softening point of approximately 345-350° F., the chlorinated diphenyl being at least equal in weight to the asphalt.

5. As a new article, a fibrous sheet material having a base coating of rubber-like material, an intermediate coating of an oil varnish containing minor amounts of hard asphalt and chlorinated diaryl, and another coating comprising in major part chlorinated diaryl and a hard asphalt.

6. As a new article, a fibrous sheet material having a base coat of rubber-like material, an intermediate coat of an oil varnish containing minor amounts of chlorinated diphenyl and asphalt, and an outer coat comprising in larger part chlorinated diphenyl and a hard, brilliant asphalt of above approximately 300° F. softening point.

7. As a new article, a fibrous sheet material having a base coat of rubber-like material, an intermediate coat of an oil varnish containing minor amounts of chlorinated diphenyl and hard asphalt, and an outer coat comprising in larger part a chlorinated diphenyl of at least approximately 54% chlorine content and a hard, brilliant natural asphalt having a softening point above approximately 345° F.

8. As a new article, a flexible fibrous sheet backing material having a base coating of rubber-like material, and a finish coating of a baked varnish comprising chlorinated diphenyl of at least about 54% chlorine content and a hard, natural asphalt of approximately 345-350° F. softening point.

9. As a new article, a fibrous sheet material having a base coating of rubber-like material, an intermediate coating of baked oil varnish containing minor amounts of chlorinated diphenyl and asphalt, and another coating of a baked varnish comprising in larger part chlorinated diphenyl of at least approximately 54% chlorine content and a hard, brilliant natural asphalt of above approximately 345° F. softening point.

10. As a new article, a fibrous sheet material having a base coating comprising pyroxylin, and another coating comprising a hard asphalt and chlorinated diaryl, the ratio of chlorinated diaryl to asphalt being not less than approximately 50:50.

11. As a new article, a fibrous sheet material having a base coating of rubber-like material, an intermediate coating comprising pyroxylin and a softener, and an outer coating comprising a hard asphalt and chlorinated diaryl.

12. A process of treating a fibrous sheet material coated with a rubber-like material, which comprises applying a coat of varnish comprising solvent, chlorinated diphenyl of approximately 54-62% chlorine content, and hard, brilliant natural asphalt of approximately 345-350° F. softening point, and baking at about 240-275° F.

13. A process of treating a fibrous sheet material coated with a rubber-like material, which comprises applying an intermediate coat of oil varnish containing minor amounts of chlorinated diphenyl and a hard asphalt, drying by heat, applying another coat of varnish comprising solvent, chlorinated diphenyl 50 to 80 parts and hard, brilliant asphalt 50 to 20 parts, and baking at about 240-275° F.

SEAPHES D. SHINKLE.